United States Patent
Assenmacher

(10) Patent No.: US 11,394,556 B2
(45) Date of Patent: Jul. 19, 2022

(54) BLOCKCHAIN-ENABLED COMPUTING

(71) Applicant: Cryptowerk Corp., Redwood City, CA (US)

(72) Inventor: Holger Assenmacher, Eulenbis (DE)

(73) Assignee: CRYPTOWERK CORP., Redwood City, CA (US)

( * ) Notice: Subject to any disclaimer, the term of this patent is extended or adjusted under 35 U.S.C. 154(b) by 273 days.

(21) Appl. No.: 16/874,203

(22) Filed: May 14, 2020

(65) Prior Publication Data

US 2020/0366489 A1     Nov. 19, 2020

Related U.S. Application Data

(60) Provisional application No. 62/848,040, filed on May 15, 2019.

(51) Int. Cl.
*H04L 29/06*     (2006.01)
*H04L 9/32*      (2006.01)
*G06F 16/23*     (2019.01)
*H04L 9/06*      (2006.01)

(52) U.S. Cl.
CPC ........ *H04L 9/3231* (2013.01); *G06F 16/2365* (2019.01); *H04L 9/0637* (2013.01)

(58) Field of Classification Search
CPC . H04L 9/3231; H04L 9/0637; H04L 2209/38; H04L 9/3239; G06F 16/2365
See application file for complete search history.

(56) References Cited

U.S. PATENT DOCUMENTS

| | | | |
|---|---|---|---|
| 4,309,569 A | 1/1982 | Merkle | 713/177 |
| 2003/0212894 A1* | 11/2003 | Buck | G06Q 20/341 |
| | | | 713/184 |
| 2019/0171849 A1* | 6/2019 | Assenmacher | H04L 69/04 |
| 2019/0332821 A1* | 10/2019 | Ebert | G06F 21/602 |
| 2022/0091578 A1* | 3/2022 | Ross | G05B 19/4099 |

OTHER PUBLICATIONS

Merkle, Ralph Charles, "Secrecy, Authentication and Public Key Systems," Ph.D. dissertation, Dept. of Electrical Engineering, Stanford University, URL: https://www.merkle.com/papers/Thesis1979.pdf, 193 pages, 1979.
Nakamoto, Satoshi, "Bitcoin: A Peer-to-Peer Electronic Cash System," URL: https://bitcoin.org/bitcoin.pdf, 9 pages, Retrieved on May 21, 2020.

* cited by examiner

*Primary Examiner* — Mahfuzur Rahman
(74) *Attorney, Agent, or Firm* — Slayden Grubert Beard PLLC

(57) ABSTRACT

A computer-implemented method is for tamper-evident recording of a plurality of executable items. Each executable item is associated with a data item verification fingerprint. The method includes computing an aggregated verification fingerprint from data item verification fingerprints using a one-way compression function so that the aggregated verification fingerprint has a first bit length. The first bit length is less than a total bit length of a concatenation of the data item verification fingerprints. The method further includes storing the aggregated verification fingerprint in a blockchain, attempting to execute an element of code, validating the element of code against the aggregated verification fingerprint, and, based on the validation, allowing execution or denying execution of the element of code.

14 Claims, 13 Drawing Sheets

FIG. 8

Dear Seal Witness user,
proof of the document that you uploaded at 2016-08-01 02-38:46 UTC
has been successfully registered in the worldwide public ledger, the blockchain.
You are now all set.
In particular, you now are in a position to be able to prove at any time to anyone
that you submitted your document and that it remained unaltered by using our verification service at
https://www.sealwitness.com:443/sealwitness.web/verify.jsp?
docRetrievalId=n 173b79f8e 171 c 195b90650cb24b236666dc62ffff65e622d 1319b5fd04887b208
Thank you for using our service,
Your Seal Witness Team P.S.: Alternatively, in case that you are legally or technologically interested,
you could perform the verification all by yourself, even without using our service.
Here are the instructions:
Use SHA-256 to calculate a hash of your document, for instance by running openssl dgst -sha256 -hex your_document
The SHA-256 hash of the submitted document was
73b79f8e171c195b90650cb24b236666dc62ffff65e622d1319b5fd04887b208.
Then take that hash 73b79f8e171c195b90650cb24b236666dc62ffff65e622d1319b5fd04887b208 and append
3e21d24dfbf0a357fb4aa18e71670c8b941395c09b219028595f0b9c76c22cae to it.
Then calculate SHA-256 of the concatenation of the two, which is
58d4a5616ef6644054753901be30e54fa3ef3fb45b93c358a26178661ff7f6ca.
Then take that hash 58d4a5616ef6644054753901be30e54fa3ef3fb45b93c358a26178661ff7f6ca and append
c1c1f73cdb819a953da857344e8e67ad3fa0546b35343a1023388bc51fac920f to it.
Then calculate SHA-256 of the concatenation of the two, which is
527383779461ffd0924a415e9d24ae9e7a7fc76e55f1b79b5950f269c273f0ab.
Then take that hash 527383779461ffd0924a415e9d24ae9e7a7fc76e55f1b79b5950f269c273f0ab and append
69481793495bdcc8b4a425c330c22cc4460b250f0c9142b2d53ed094cde3a9d3 to it.
Then calculate SHA-256 of the concatenation of the two, which is
493af06e912d2bbba27231a7b8245cfdde229f97797cc10a0672d03cddc871ae.
Then take that hash 493af06e912d2bbba27231a7b8245cfdde229f97797cc10a0672d03cddc871ae and append
b5e2093104ae051d1cbd36cede74e1c7237262fb79eaa8d5eebda7306a959820 to it.
Then calculate SHA-256 of the concatenation of the two, which is
923188377359563ca6fcf7c620d2e3dI06cfb4098c82e4cdf8c452b40b53336d.
This is the value which you will find publicly available in the blockchain named 'btc.test'
in transaction id=669bc832d35ff64ad481a49dacac95326dd1c48b38a953fff77ba35993f0e04e having been inserted
there at 2016-08-01 02-40-15 UTC
in section "vout"/n=0/"scriptPubKey"/"hex" as the sixth and following bytes.
In case you run a full node with option txindex=1 and are using the standard Bitcoin command line interface,
you might want to run
bitcoin-cli getrawtransaction 669bc832d35ff64ad481a49dacac95326dd1c48b38a953fff77ba35993f0e04e 1
Or you can take a look here:
https://www.bloc/txtrail.com/tBTC/tx/669bc832d35ff64ad481a49dacac95326dd1c48b38a953fff77ba35993f0e04e or
https://testnet.blockexplorer.com/669bc832d35ff64ad481a49dacac95326dd1c48b38a953fff77ba35993f0e04e or
https://tbtc.blockr.io/tx/info/669bc832d35fT64ad481a49dacac95326dd1c48b38a953fff77ba35993f0e04e or
https://live.blockcypher.com/btc-
testnet/tx/669bc832d35ff64ad481a49dacac95326dd1c48b38a953fff77ba35993f0e04e
at the first "Output Scripts" entry at bytes four and following after OP_RETURN.

BLOCKCHAIN-ENABLED COMPUTING

PRIORITY

The present application claims priority to U.S. Provisional Patent Application No. 62/848,040 filed May 15, 2019, the contents of which are hereby incorporated in their entirety.

FIELD OF THE INVENTION

The present disclosure relates to blockchain technology and to computer security and, more particularly, to sensing levels of liquids in devices and, more particularly, to blockchain enabled computing.

BACKGROUND

The presented invention relates to the field of blockchains, i.e., a computerized ledger system to create trusted records of (mostly) financial transactions.

In the year 2008, a system and algorithm has been presented for an electronic cash system (Satoshi Nakamoto, "Bitcoin: A Peer-to-Peer Electronic Cash System", available at https://bitcoin.org/bitcoin.pdf). Its underlying foundation, the so-called blockchain, enables distributed consensus without necessarily requiring trust. Consensus can be achieved on whether a certain data item has been presented at a given time. In the application of blockchain to Bitcoin, this is intended to publicly register electronic cash transfers and to prevent anyone from spending cash amounts more than once without requiring a central authority.

Due to the way blockchains are constructed, their transaction throughput is limited. In 2016, blockchain as-applied to Bitcoin was limited to a worldwide total of about seven transactions per second as-of 2016, and incurs cost to reimburse those operating the infrastructure. This led to other parties offering alternative technologies and blockchain implementations based on the same principles but trying to overcome the original limitations of the blockchain.

SUMMARY

Embodiments of the present disclosure include a computer-implemented method. The method may be for tamper-evident recording of a plurality of executable items. Each executable item may be associated with a data item verification fingerprint. The method may include computing an aggregated verification fingerprint from data item verification fingerprints using a one-way compression function so that the aggregated verification fingerprint has a bit length. The bit length may be less than a total bit length of a concatenation of the data item verification fingerprints. The method may further include storing the aggregated verification fingerprint in a blockchain, attempting to execute an element of code, validating the element of code against the aggregated verification fingerprint, and, based on the validation, allowing execution or denying execution of the element of code.

Embodiments of the present disclosure may include an article of manufacture. The article may include a non-transitory machine-readable medium. The medium may include instructions. The instructions, when loaded and executed by a processor, may cause the processor to compute an aggregated verification fingerprint from data item verification fingerprints using a one-way compression function, such that the aggregated verification fingerprint has a first bit length, which is less than a total bit length of a concatenation of the data item verification fingerprints. The processor may be further caused to store the aggregated verification fingerprint in a blockchain, receive an attempt to execute an element of code, validate the element of code against the aggregated verification fingerprint, and, based on the validation, allow execution or deny execution of the element of code.

BRIEF DESCRIPTION OF THE DRAWINGS

FIG. 8 illustrates instructions for a user of a blockchain.

DETAILED DESCRIPTION

Figure 1:
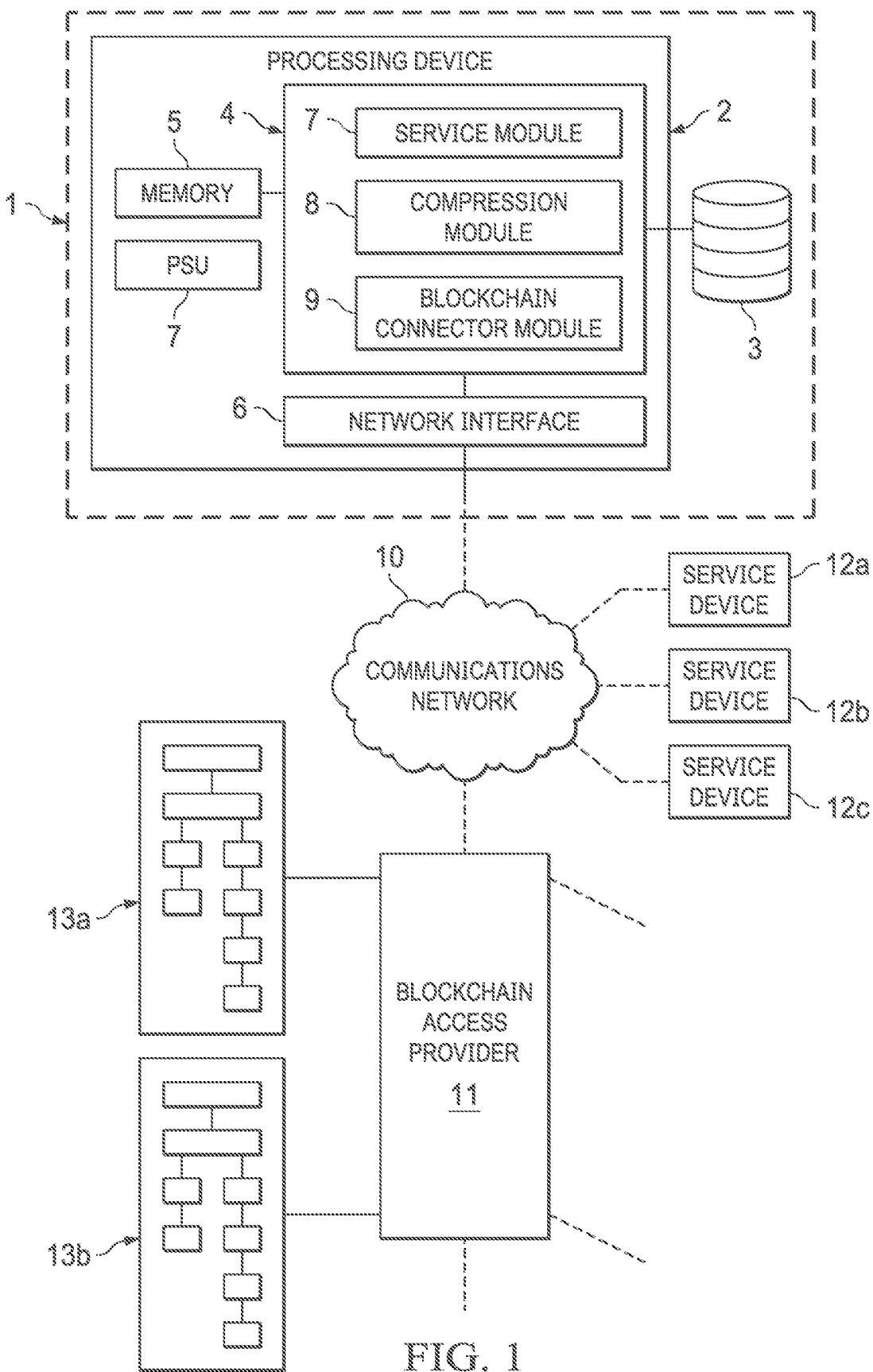
FIG. 1 shows a first embodiment of a system 1 of tamper-evident recording of service data in a schematic block diagram.

FIG. 1 shows a first embodiment of a system 1 of tamper-evident recording of service data in a schematic block diagram. The system 1 comprises a processing device 2 and a verification database 3. Processing device 2 in the present embodiment is a computer/server and comprises a microprocessor 4 (e.g., Intel i7) with memory 5, and further a network interface 6 and a power supply unit 7. For reasons of clarity, the connections from and to power supply unit 7 are not shown in FIG. 1.

As can be seen from FIG. 1, processor 4 in this embodiment comprises a service module 7, a compression module 8, and a blockchain connector module 9, the functionality of which will be explained in detail in the following. These modules are provided as programming, stored in memory 5. Execution of the corresponding programming by processor 4 causes the processor 4 to provide the functionality of the aforementioned modules 7-9.

Network interface 6 connects the processing device 2 and more precisely the processor 4 with a communications network 10, e.g., the Internet. Network interface 6 is configured to receive and transmit data, for example from and to a blockchain access provider 11 as well as from and to multiple service devices 12a-12c.

The blockchain access provider 11 allows the processing device 2, and more precisely the blockchain connector module 9, to access multiple blockchains 13a, 13b, and in this embodiment the Bitcoin blockchain as well as the Ethereum blockchain. It is noted, that generally the two blockchains 13a, 13b may be formed by a multitude of nodes. For increased clarity, a summarized representation for this typical and so-called "distributed ledger" setup is shown in FIG. 1 to not obscure the present explanation. While the number of nodes of the respective blockchains 13a and 13b are not of particular importance, a large number of nodes, as will be apparent to one skilled in the art, increases the security of the system 1 in view of the increased number of copies of the blockchain.

Service devices 12a-12c in this embodiment provide data item verification fingerprints to the system 1 over communications network 10. The data item verification fingerprints are cryptographic one-way hashes of associated service data items that are to be recorded by system 1. A service data item comprises (arbitrary) data. For the present discussion of the embodiment of FIG. 1, the service data items comprise each a file of an electronic document, such as in Portable Document Format (.pdf) or in JPEG Format (.jpg).

It is emphasized that the service data items themselves are not transmitted to the system 1 in this embodiment, providing a high level of privacy, which is also referred to in the following as "ultimate privacy concept". Ultimate privacy is provided in view that the system 1 allows to verify the existence of a particular piece of information, i.e., the service data item, at a given time, while the respective piece of information does not need to be presented to the system 11. This is highly beneficial not only for classified information, but also for sensitive business and personal data to avoid eavesdropping during transmission and processing.

In the context of the present explanation, a service device 12a-12c is an electronic device that is configured for communication with system 1. For example, a service device 12a-12c may be a computer, a server, a cloud service, a smart phone, a tablet, a smart watch, a smart wearable, an IoT device, or any other suitable device. The service devices 12a-12c do not need to be able to connect to a blockchain so that even devices 12a-12c are conceivable that only have limited computing power or limited network access. For example, a smart switch with a corresponding programming using the ZigBee protocol may be one of the service devices 12a-12c, which is able to connect to system 1 over a corresponding hub, but not to other internet-connected services. In another example, Internet-connected camera with a limited computing power may be used as one of the service devices 12a-12c and may upload data item verification fingerprints of images taken by it. Certainly, not all of the service devices 12a-12c of FIG. 1 need to be of the same type, as should easily be apparent. Similarly, a higher or lower number of service devices 12a-12c may be connected with system 1 at a given time.

Verification database 3 in this embodiment, among other data, stores cryptographic hashes, authentication paths, as well as transaction identifiers, referred to in the following as seal of an associated service data item or "SmartStamp". The verification database 3 in this embodiment is a typical relational database, implemented on a corresponding database server (not shown). Memory 5 of processing device 2 in addition to the mentioned programming also comprises a service data (FIFO) queue, the operation of which will be explained in detail in the following.

Figure 2A:
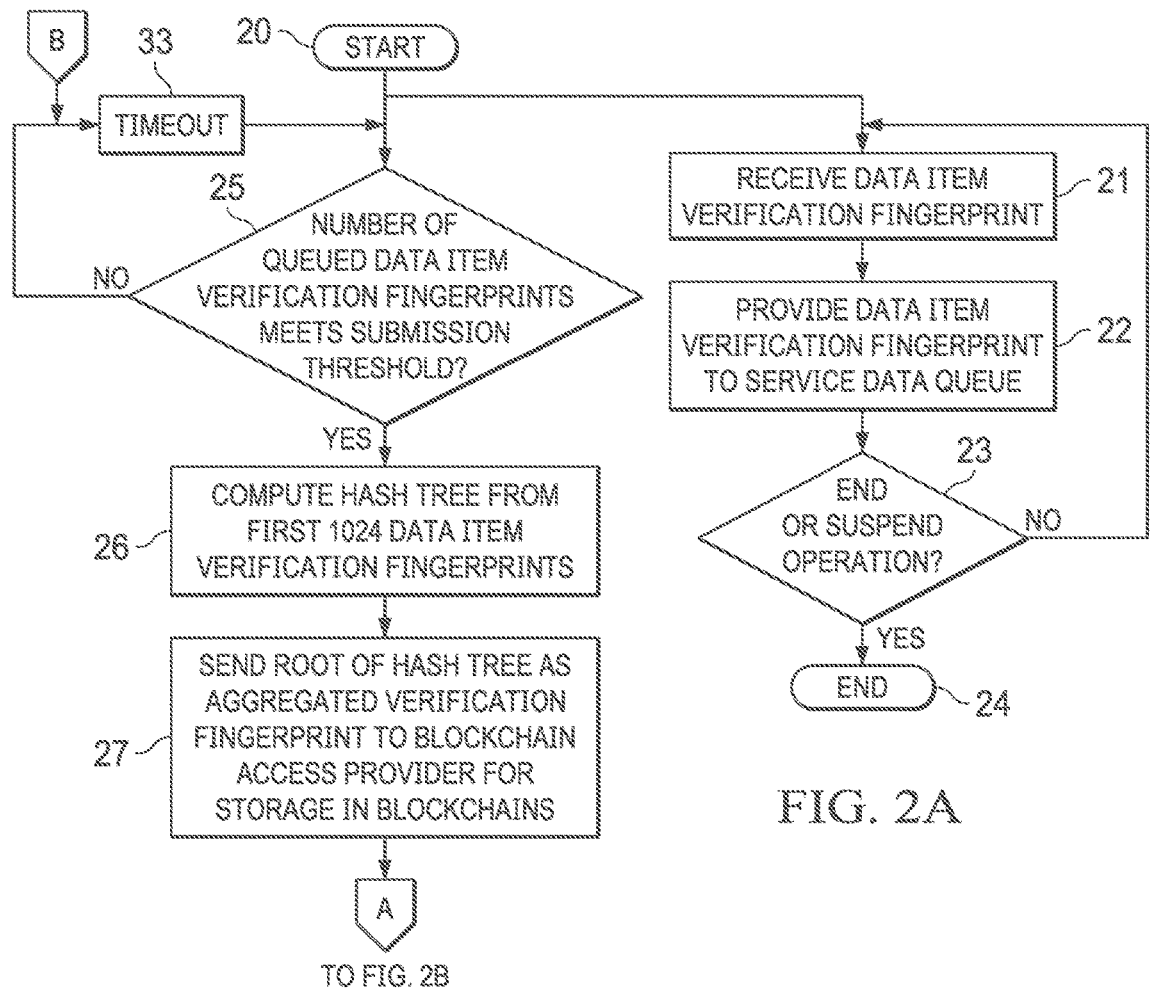
FIGS. 2A and 2B show an embodiment of a method of tamper-evident recording of service data according to the invention in a schematic flow chart.
Figure 2B:
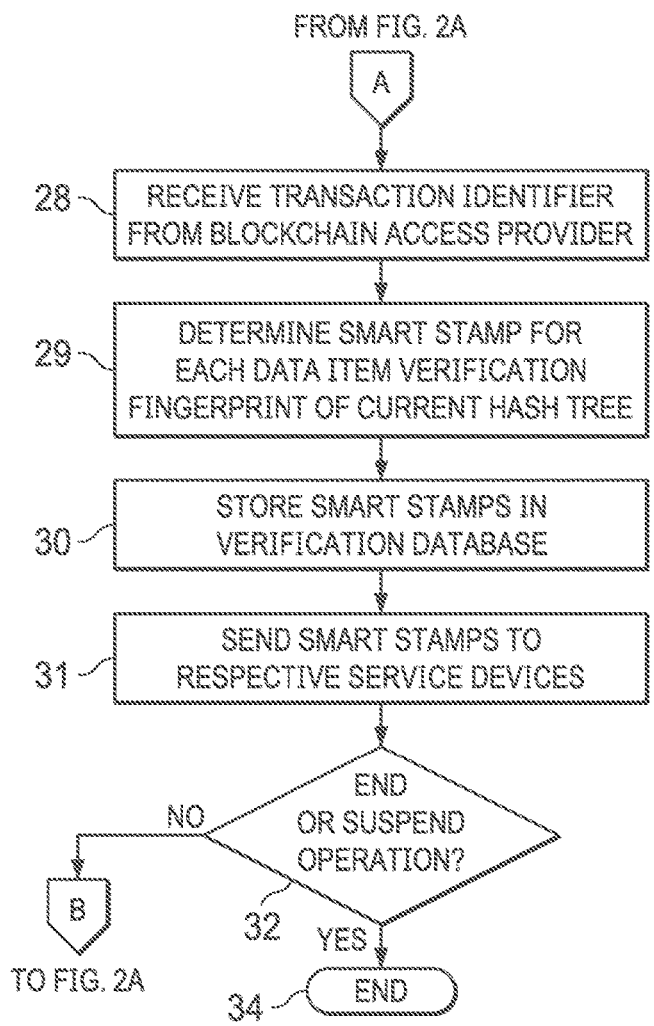

FIGS. 2A and 2B show an embodiment of a method of tamper-evident recording of service data according to the invention in a schematic flow chart. The method of FIGS. 2A and 2B is used by the system 1 of the embodiment of FIG. 1. Correspondingly, reference will be made to the respective components of FIG. 1 when discussing the particulars of FIG. 2.

The method begins with the initialization of system 1 in step 20 by powering on processing device 2 and verification database 3. After initialization, the system 1 conducts two parallel routines, namely a "reception routine" and a "processing routine".

In the reception routine, the system 1 and more precisely service module 7 is set to an active mode. The service module 7 in step 21 then is set to receive data item verification fingerprints from service devices 12a-12c. As discussed in the preceding, the data item verification fingerprints are cryptographic one-way hashes of associated service data items that are to be recorded by system 1. In this embodiment, the hashes are generated using the SHA-256 hash function/algorithm. The hashes may be computed by the service devices 12a-12c or by a third-party device. The data item verification fingerprints are upon reception placed in the service data FIFO queue in step 22. In step 23, it is checked, whether the operator of system 1 would like to terminate or suspend operation. For example, the operator may set a corresponding flag, stored in memory 5, using a web interface when maintenance is needed. The reception routine then ends in step 24. Otherwise, steps 21 through 23 are conducted repeatedly.

Parallel to the reception routine, the processing routine of steps 25-32 is conducted. In step 25, the compression module 8 determines, whether the number of queued data item verification fingerprints of the service data queue meets a certain threshold, for example 1024 entries, i.e., 1024 fingerprints. If this is not the case and after timeout 33, i.e., 5 seconds, step 25 is conducted again.

In case 1024 data item verification fingerprints or more are stored in the service data queue of memory 5, the determination of step 25 results in a positive outcome. Then, in step 26, the first 1024 data item verification fingerprints are loaded from the queue and subsequently are deleted therefrom, as in a typical FIFO queue. The 1024 data item verification fingerprints are then used to compute a Hash tree, namely in this embodiment a binary Merkle Tree (Ralph Merkle, "Secrecy, authentication and public key systems/A certified digital signature", Ph.D. dissertation, Dept. of Electrical Engineering, Stanford University, 1979, and U.S. Pat. No. 4,309,569) to combine all 1024 fingerprints. If the number of fingerprints is not a power of two, it is filled up by dummy fingerprints to the next bigger number of two (padding). Since this however is the case in this embodiment, padding is not needed. The present embodiment uses the SHA-256 algorithm to compute the Merkle Tree.

The number of hashes required to recalculate all hashes along the path (branch node hashes) of the Merkle Tree from the original fingerprint to its root, is of the order $O(\log N)$ where N is the total number of fingerprints to be registered. The root R of the Merkle Tree, in the nomenclature of U.S. Pat. No. 4,309,569, $R=H(1,n,Y)$ is subsequently provided to blockchain connector module 9 as an aggregated verification fingerprint. The use of hash functions advantageously allows to map data of arbitrary length to the root R, which has a fixed length in this embodiment.

The compression module 8 temporarily stores the root R, the branch node hashes, and the 1024 data item verification fingerprints in memory 5.

The blockchain connector module 9 in step 27 subsequently transmits the aggregated verification fingerprint to blockchain access provider 11 over network interface 6. Encryption is advantageously not needed in this communication. Blockchain access provider 11 then stores the aggregated verification fingerprint in blockchains 13a and 13b, i.e., into corresponding transactions of the blockchains 13a and 13b.

Once storing is completed and in step 28, the blockchain access provider 11 provides transaction identifiers back to the blockchain connector module 9. In this embodiment, the transaction identifiers are links to the block and transaction, into which the aggregated verification fingerprint was successfully written. The identifiers furthermore allow to determine the date and time, when the aggregated verification fingerprint was submitted to the blockchain and furthermore when the containing block has been appended to the blockchain and been agreed upon. In the case of Bitcoin, the latter time is on average half of one confirmation interval (or "consensus heartbeat", 10 minutes) later than the actual submission time if the associated transaction fee is high enough to warrant immediate inclusion in a block. Two transaction identifiers are returned in view that the aggregated verification fingerprint was written/stored into two blockchains 13a and 13b.

The two identifiers are in step 29 transferred to the compression module 8, the latter of which then obtains the temporarily stored branch node hashes and the 1024 data item verification fingerprints from memory 5. Once the data is present in compression module 8, so-called "SmartStamps" are determined for each of the 1024 data item verification fingerprints. A SmartStamp is a bundle of the hashes, needed to retrospectively verify a certain data item verification fingerprint and thus the underlying service data item. This will be explained in further detail in the following, The SmartStamps thus are electronic "seals" of the respective service data items.

For each SmartStamp, the associated data item verification fingerprint, an authentication path, the transaction identifiers of the current aggregated verification fingerprint, the hash function used, as well as at least one identifier of the blockchain 13a or 13b, i.e., Bitcoin or Hyperledger in this embodiment, are bundled together. Subsequently the respective SmartStamps are stored in verification database 3 in step 30 and transmitted to the service device 12a-12c, from which the respective data item verification fingerprint originated in step 31. It is noted that for each data item verification fingerprint herein, two SmartStamps are determined, in view that two blockchains 13a and 13b are used. Accordingly, a first SmartStamp relates to the Bitcoin blockchain (first blockchain) and a second SmartStamp relates to the Hyperledger blockchain (second blockchain).

In step 32 it is again determined, whether the operator of system 1 would like to terminate or suspend operation. The processing routine then ends in step 34. Otherwise, steps 25 through 33 are conducted repeatedly and multiple aggregated data item verification fingerprints are subsequently stored in the blockchains 13a, 13b.

In the preceding discussed, reference was made to an authentication path. The authentication path, in line with the nomenclature of U.S. Pat. No. 4,309,569, comprises all branch node hashes, that are needed compute the root R for a given data item verification fingerprint. Accordingly, for the above example of an aggregation of 1024 data item verification fingerprints, 1024 corresponding authentication paths are determined.

Figure 3:
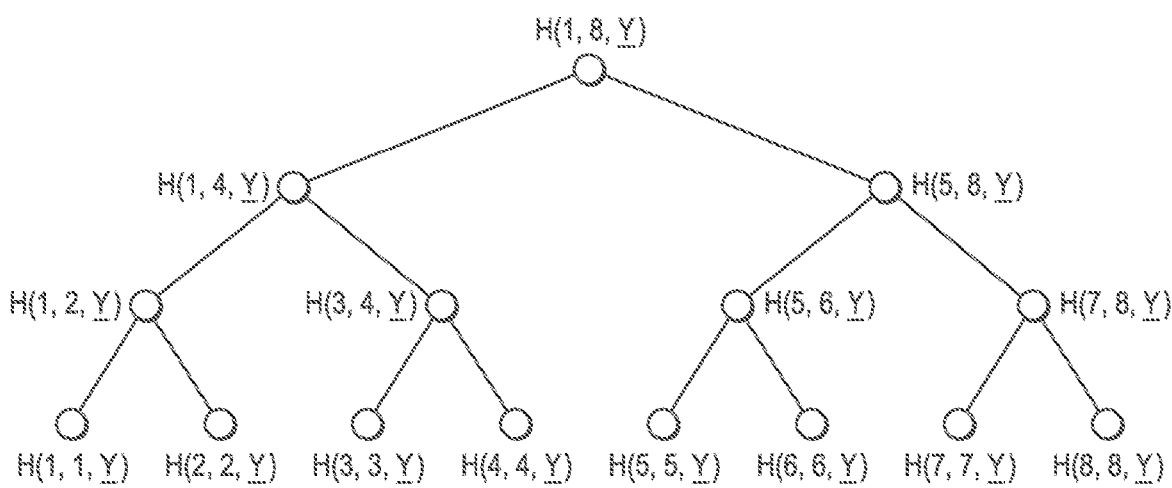
FIG. 3 shows a representation of an exemplary hash tree, as used in the embodiment of FIGS. 2A and 2B.

FIG. 3 shows a representation of an exemplary hash tree, as used in the embodiment of FIG. 2. To not unnecessarily obscure the present discussion, an exemplary hash tree for a total of eight data item verification fingerprints are shown. Basis of the formation of the hash tree are eight data verification fingerprints H(1,1,Y), H(2,2,Y), H(3,3,Y), H(4,4,Y), H(5,5,Y), H(6,6,Y), H(7,7,Y), and H(8,8,Y). As mentioned, these data item verification fingerprints are hashes of their associated service data items, e.g., the respective .pdf file, token, etc.

The compression module 8 in step 26 correspondingly computes a first layer of branch node hashes, namely H(1,2,Y), H(3,4,Y), H(5,6,Y), and H(7,8,Y). As shown, each of these branch node hashes use two data item verification fingerprints as input, hence the term binary hash tree.

Then, a second layer of branch node hashes is computed, namely H(1,4,Y) and H(5,8,Y). Finally, root hash R=H(1,8,Y) is computed. All of the aforesaid hashes herein are calculated using the SHA-256 algorithm.

To later on, i.e., retrospectively, verify a certain service data item, a part of the hash tree can be computed again.

In the exemplary hash tree of FIG. 3 and for a given service data item Y1, the data item verification fingerprint H(1,1,Y) is computed. Then, using the second data item verification fingerprint H(2,2,Y), the branch node hash H(1,2,Y) is computed. Consequently, using H(3,4Y), the second layer branch node H(1,4,Y) is computed. Using H(1,4,Y) and branch node hash H(5,8,Y), root R can be computed.

It follows, that to retrospectively compute the root hash R from service data item Y1, the hashes H(2,2,Y), H(3,4,Y), and H(5,8,Y) are required. These hashes form the aforementioned authentication path, which forms part of the SmartStamp. In particular from FIG. 3, it will be apparent that each data item verification fingerprint has its own authentication path, i.e., its own set of required hashes.

Once the root hash R is computed, one of the blockchains 13a, 13b, is accessed, namely using the transaction identifier of the SmartStamp. This allows retrieving the original aggregated verification fingerprint. In case the original aggregated verification fingerprint matches exactly the root hash R computed for the verification, proof is given that the service data item Y1 was present at the date/time associated with the used transaction identifier.

Figure 9:
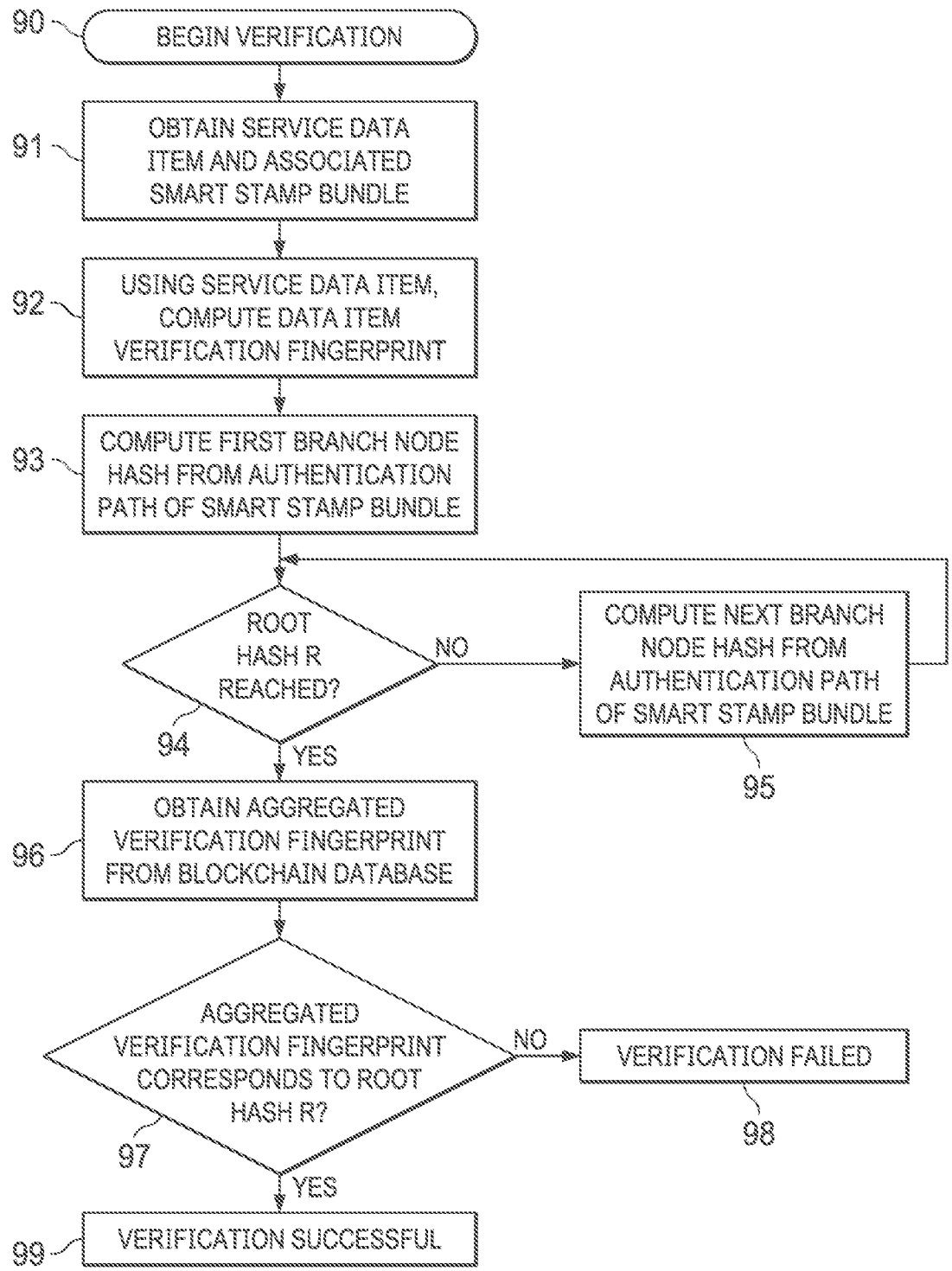
FIG. 9 shows a corresponding method of retrospective verification of service data in a schematic flow chart.

FIG. 9 shows a corresponding method of retrospective verification of service data in a schematic flow chart. An exemplary excerpt of a "clear text" SmartStamp that comprises the necessary hashes for the Bitcoin blockchain as well as instructions for a user is shown in FIG. 8.

The method and system of FIGS. 1 and 2 enables an arbitrary service to record service data items, i.e., arbitrary data, in a tamper-proof way and provides properties inherent to blockchain technology to any type and length of data, thus for any content. The method and system of FIGS. 1 and 2 therefore is highly scalable and can be used even for large amounts of data, such as entire corporate database systems. It is thus usable for "big data" applications.

The method and system of FIGS. 1 and 2 can be used with any existing blockchain independent of typical blockchain limiting factors such as transaction throughput or cost. A non-comprehensive list of advantageous properties of the method and system of FIGS. 1 and 2 is: providing consensus on data items, data items being irrevocable, immutable, durable, authentic, private, and globally visible for the following reasons:

irrevocable—because of a non-replaceable chain of blocks in a blockchain confirming the one that contains the document's fingerprint, immutable—because changing the fingerprint requires changing all following blocks in a blockchain, which is generally computationally infeasible, durable—because it can persistently be stored by thousands of blockchain "nodes" worldwide, authentic—because it is computationally infeasible to fabricate a different document having the same fingerprint, private—because the service data item's contents cannot be reconstructed from its fingerprint, and globally visible—because everyone can inquire any of the thousands of nodes of the blockchain worldwide to retrieve the fingerprint.

This way, even if the provider of the system 1 ceases to operate, one can still verify a fingerprint, retaining the value of the original registration. This assumes that the underlying blockchains continues to exist—which currently is more likely for the Bitcoin blockchain than for others.

While desired properties are maintained, limitations of the underlying blockchain are lifted. The number of transactions (e.g. in the example above fingerprints to be stored) provided by the system 1 is independent of the number of transactions to be registered in the blockchains. Millions of data item verification fingerprints can be produced, aggregated, and result in just one blockchain transaction. In particular, transaction throughput is substantially decoupled. A current maximum of seven transactions per second of the Bitcoin blockchain can be turned into thousands or more per second, only depending on the capabilities of the service provider's infrastructure, not on the blockchain.

Also, per-transaction fees for blockchain transactions can be shared among all service data items. So, the higher the number service data items, the lower the per-service-data-item-transaction fees incurred by the use of the blockchain. This enables use of blockchain technology for high-volume low-cost services for example including electronic document "notarization", micropayments, entry access systems, or passport validation.

Figure 4:
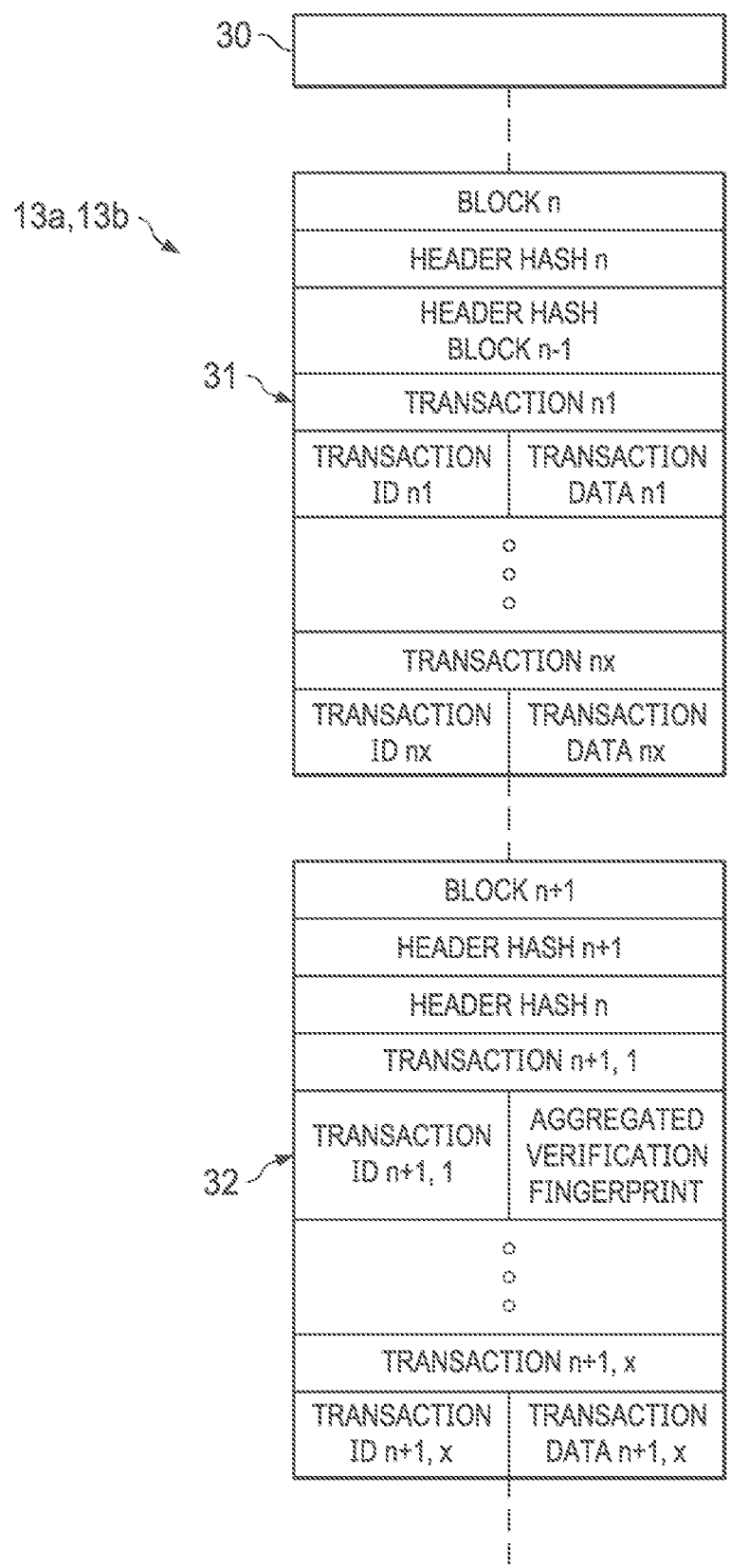
FIG. 4 shows a schematic representation of an example blockchain.

FIG. 4 shows a schematic representation of a typical blockchain 13a, 13b. Initiation of the blockchain 13a, 13b starts with a genesis block 30. All subsequently following blocks 31, 32, etc. are cryptographically linked to each other by hashes, stored therein. Each block 31, 32 is stored with a header hash, which is calculated when the block is written. Various methods for calculating the header hash exist in the art.

For example, the header hash may be a hash of the entire block. The next subsequent block expressly includes the header hash of the previous block. In the shown schematic representation of FIG. 4, block 32, i.e., block n+1, includes the header hash of block 31, i.e., block n. Using this setup, it is unfeasible to change the contents of a given block without changing all subsequent (younger) blocks in the chain. This is due to the fact that a change of the block would change the respective header hash, assuming a suitable hash function is used with a sufficiently low collision probability.

Besides the header hashes, each block 31, 32 comprises a plurality of transactions, each comprising a transaction ID and transaction payload/transaction data. As can be seen from FIG. 4, the aggregated verification fingerprint is stored in block n+1 as transaction n+1,1. The associated transaction ID n+1,1 links to the storage position of the aggregated verification fingerprint and comprises the date/time the aggregated verification fingerprint was stored in the blockchain.

Figure 5A:
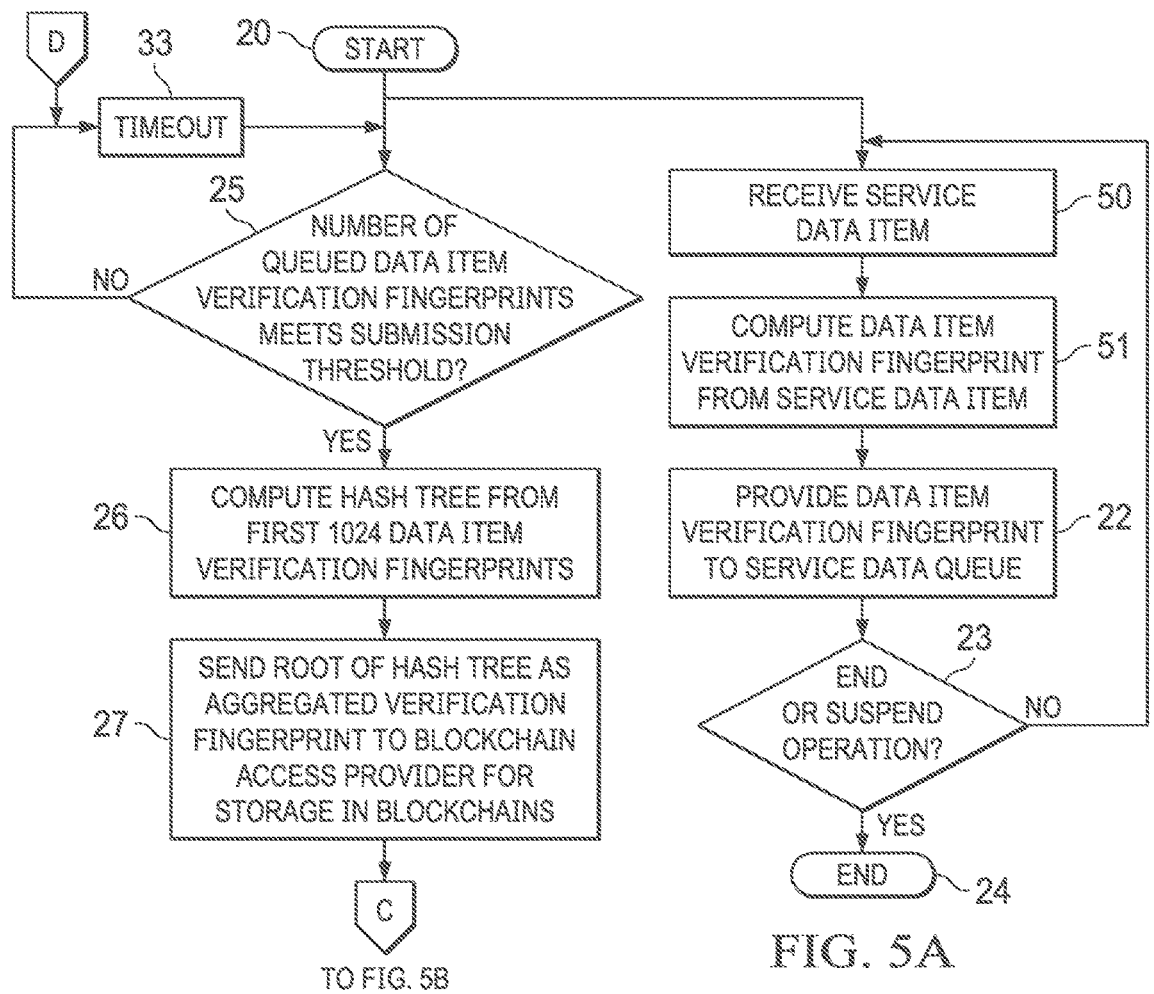
FIGS. 5A and 5B shows a second embodiment of a method of tamper-evident recording of service data according to the invention in a schematic flow chart.
Figure 5B:
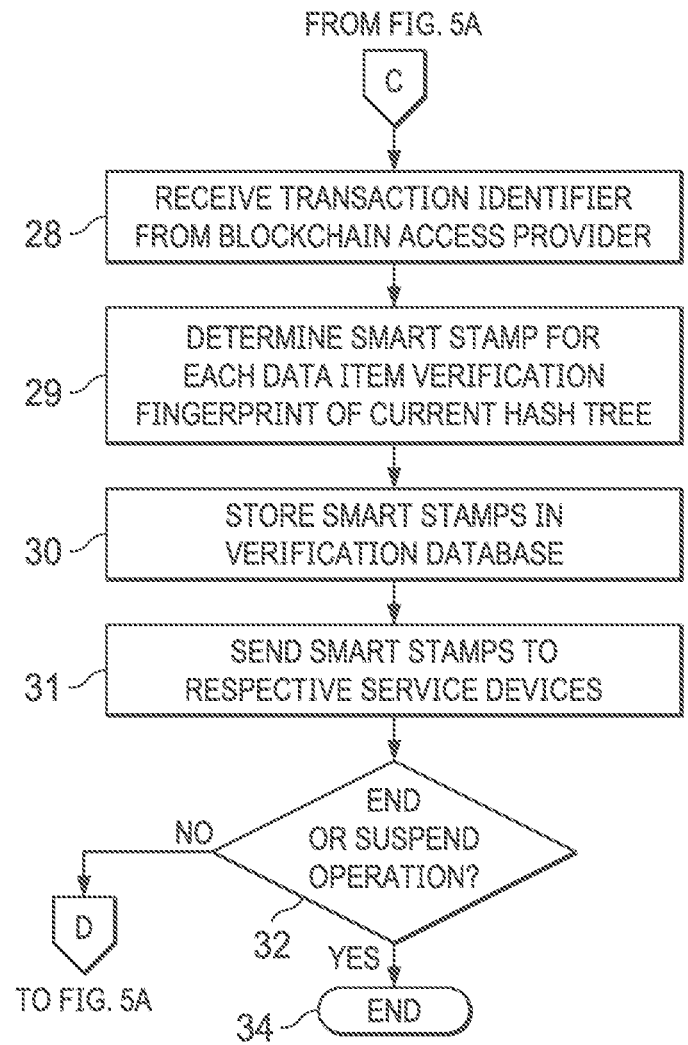

FIGS. 5A and 5B shows a second embodiment of a method of tamper-evident recording of service data according to the invention in a schematic flow chart.

The present embodiment corresponds to the embodiment of FIGS. 2A and 2B with the exception of the operation in the reception routine. In this embodiment, the service devices 12a-12c provide service data items, instead of the data item verification fingerprints to the service module 7. A corresponding service data item is received by the service module 7 in step 50. The service module 7 consequently computes an associated data item verification fingerprint for the received service data item in step 51 using the SHA-256 cryptographic hash function. Corresponding to the embodiment of FIGS. 2A and 2B, the data item verification fingerprint is provided to the service data queue in step 22. The reception routine is repeated as in the embodiment of FIGS. 2A and 2B to subsequently provide a plurality of data item verification fingerprints to the service data queue.

The present embodiment provides that the service devices 12a-12c do not need to compute the data item verification fingerprint on their side, allowing that the service devices 12a-12c may have even less computing power.

Figure 6:
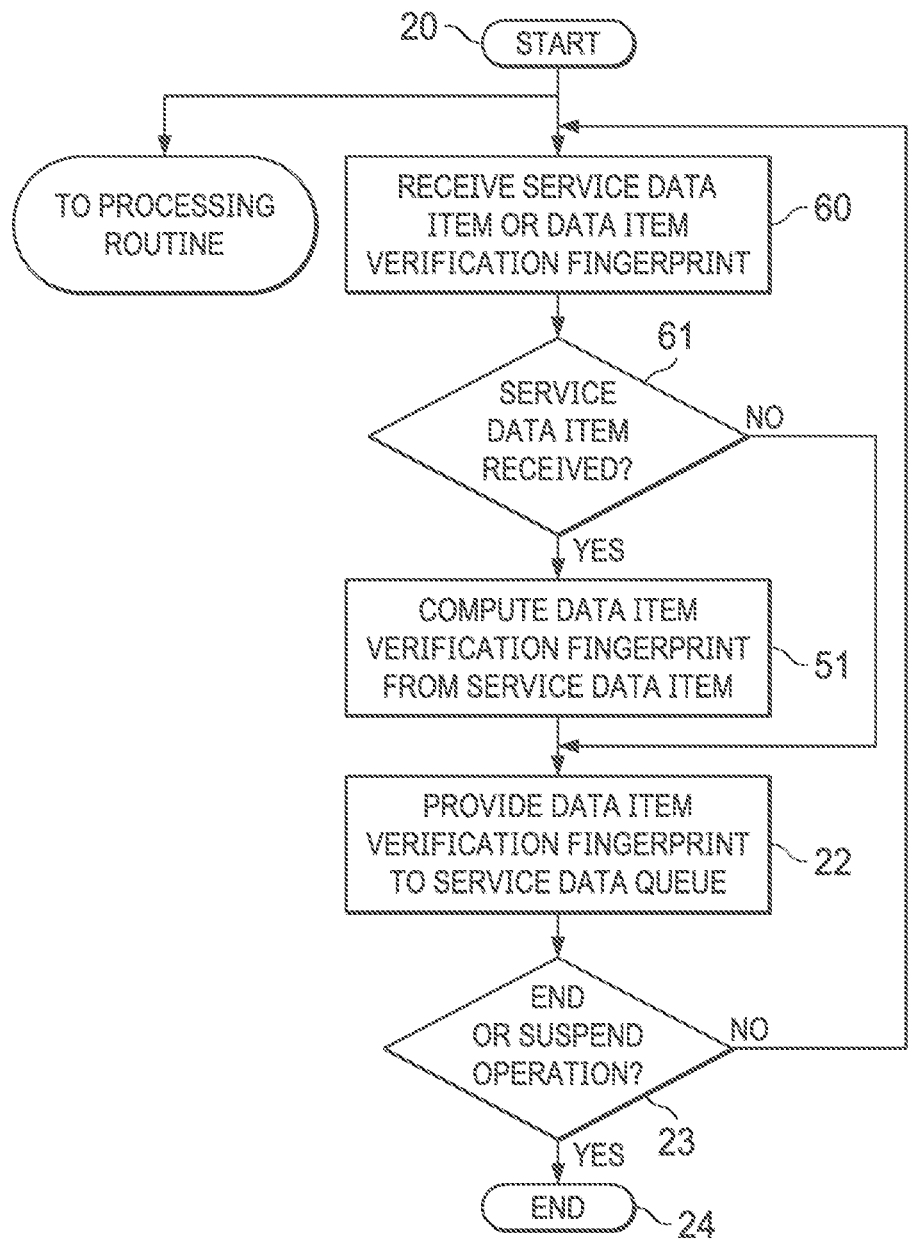
FIG. 6 is a schematic flow chart of operation in the reception routine.

Certainly, it is possible that the service module 7 allows for the reception of both, service data items and data item verification fingerprints. A corresponding embodiment of the operation in the reception routine is shown in the schematic flow chart of FIG. 6. It is noted that this reception routine could be employed in all embodiments herein, in particular in the embodiments of FIG. 2, FIG. 5, and FIG. 7.

In step 60 of the reception routine of this embodiment, a service data item or a data item verification fingerprint is received in step 60. Consequently and in step 61, it is determined if a service data item or a data item verification fingerprint was received. The determination is based on a transmission flag, provided by the respective sending service device 12a-12c.

In case a service data item was received, the associated data item verification fingerprint is computed in step 51, as discussed in the preceding with reference to FIG. 5. Otherwise, the routine directly proceeds with step 22 in which the data item verification fingerprint, either the computed one or the received one, is put into the service data queue. The remaining steps and also the processing routine corresponds to the embodiment of FIG. 2.

Figure 7A:
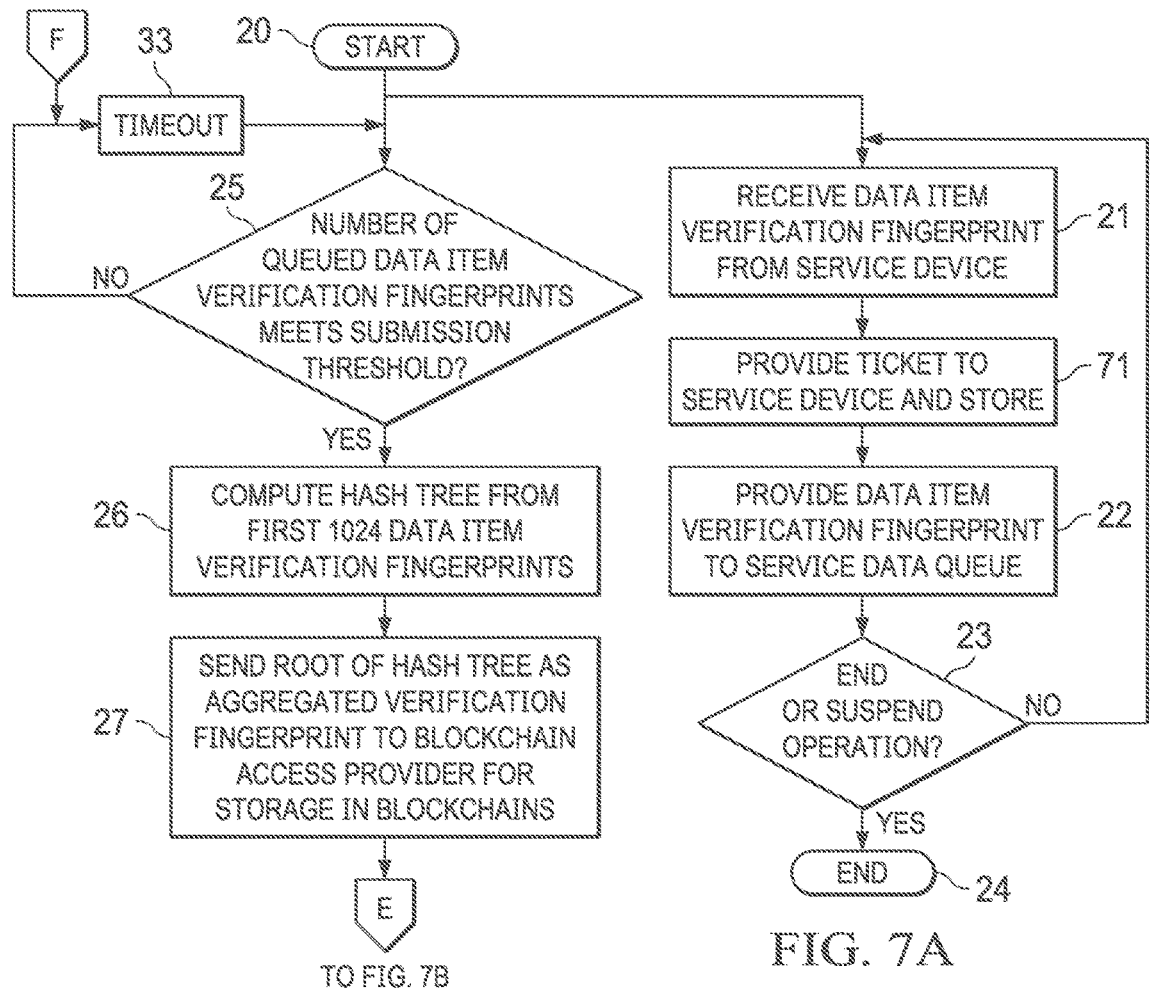
FIGS. 7A and 7B show a further embodiment of a system of tamper-evident recording of service data according to the invention in a schematic block diagram.
Figure 7B:
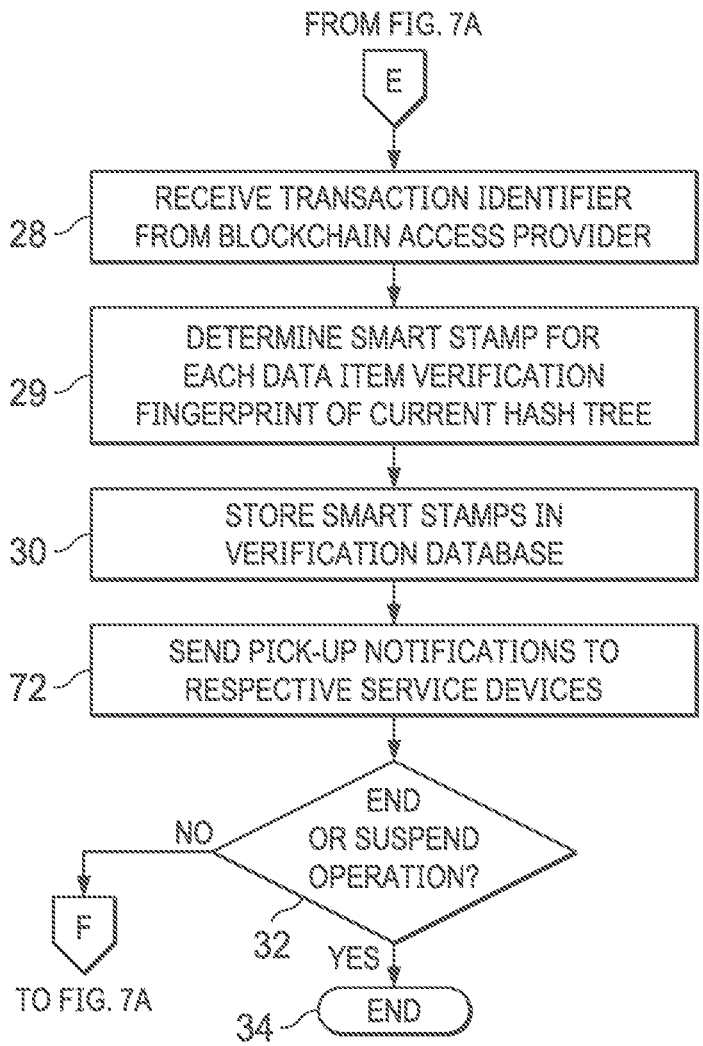

FIGS. 7A and 7B show a further embodiment of a system of tamper-evident recording of service data according to the invention in a schematic block diagram. The embodiment of FIG. 7 corresponds to the embodiment of FIG. 2 with the exception of steps 71 and 72. In step 71 and thus after a data item verification fingerprint has been received from a service device 12a-12c in step 21, the service module 7 generates and provides an individual ticket back to the respective service device 12a-12c. The ticket in this embodiment is randomly generated 256-bit data that is associated with the respective data item verification fingerprint. The ticket is also temporarily stored together with the respective data item verification fingerprint and an origination ID, pointing to the service device 12a-12c that provided the data item verification fingerprint, in memory 5.

Issuing a ticket instead as the immediate result of submitting a service data item or its fingerprint eases the submitter's task of keeping track of the item. This is due to invariances in processing times by both the bundling heuristics and the underlying blockchain. When a data item is submitted, typically both are unknown. The former may depend on reaching a certain threshold as in step 25 which in turn depends on other submitters. The latter depends on the acceptance of the transaction containing the aggregated fingerprint as a new block and also on how many blocks are added after that block. By using a ticket, a submitter can simply repeatedly ask whether one or all SmartStamps are available, typically one per underlying blockchain, and when they become available then store them and discard the ticket. Alternatively, a submitter may be asynchronously notified of one or more SmartStamps being available. That way, all potential difficulties with respect to bundling and/or the underlying blockchain(s) stay hidden from a service user and eventually a conclusive proof is delivered.

After the aggregated verification fingerprint has been stored in the blockchains 13a, 13b in step 27 and the respective transaction identifiers have been received from the blockchain access provider 11 in step 28, the SmartStamps for each data item verification fingerprint of the current processing run are determined again in step 29.

Each SmartStamp in this embodiment comprises the authentication path, necessary for retrospective verification of the respective data item verification fingerprint, the transaction identifiers of the current aggregated verification fingerprint, identifiers of the two blockchains 13a, 13b, i.e., Bitcoin or Hyperledger, and the hash function used. Each SmartStamp is then correlated with the ticket of the respective underlying data item verification fingerprint, obtained from memory 5.

Subsequently the respective SmartStamp is stored in verification database 3 in step 30. Then, the service module 7 sends a "pick-up" notification to the service devices 12a-12c in step 72 according to the stored origination IDs stored in memory 5. The service devices 12a-12c may then, or at a later point, obtain the SmartStamp by sending a request for transmission of the SmartStamp, comprising the respective ticket ID, to system 1.

FIG. 9 shows a method of retrospective verification of service data in a schematic flow chart. Such verification could be conducted at any time after the generation of a SmartStamp for a given service data item Y by the processing routine of the preceding embodiments. In this example, it is assumed that the verification is conducted by a third-party verification device or service. However, the verification could certainly also be conducted by system 1 or one or the service devices 12a-12c.

In step 91, the respective service data item Y1 to be verified is obtained, i.e., received by the verification device or obtained from a storage unit. In addition, the SmartStamp, associated with the service data item Y1 is obtained, i.e., received by the verification device, obtained from a storage unit, or obtained from verification database 3 using the ticket of the embodiment of FIG. 7. As mentioned, the SmartStamp is a bundle and comprises information on the hash function used, the authentication path for the respective service data item, transaction identifiers, and identifiers of the blockchain 13a or 13b. As the aggregated bundle of service data items usually varies with the underlying blockchain, its average confirmation time and other properties, in general the authentication paths for the same service data item but different blockchains differ. Consequently, in effect, one SmartStamp per underlying blockchain may be delivered.

In step 92, the verification device computes the data item verification fingerprint $H(1,1,Y)$ using the service data item Y1 and the hash function according to the SmartStamp.

In step 93 and using the data item verification fingerprint obtained in step 92 and the first hash of the authentication path, stored in the SmartStamp, the verification device computes the first branch node hash $H(1,2,Y)$ of the hash tree. In step 94, it is determined whether the root hash R has been reached. In this example, the verification device checks whether the authentication path of the SmartStamp comprises further hashes. If this is the case and in step 95, the verification device computes the next branch node hash $H(1,n,Y)$ using the branch node hash obtained last, i.e., $H(1,2n-1,Y)$ and the next hash of the authentication path. The number of iterations certainly depend on the size of the hash tree and thus, the number of data item verification fingerprints that are mapped to the associated aggregated verification fingerprint.

Once the root hash R has been reached and in step 96, the verification device queries the blockchains 13a, 13b according the SmartStamp, to provide the transaction data associated with the transaction ID of the SmartStamp. The verification device in this step could, e.g., contact the blockchain access provider 11 of FIG. 1 or connect to the blockchains 13a, 13b directly.

Certainly, while it would be sufficient to contact one of the blockchains 13a, 13b, for increased certainty, both are contacted in this embodiment. In step 97, it is determined, whether the two aggregated verification fingerprints, obtained from blockchains 13a, 13b, correspond to the root hash R, just calculated.

If this is the case, verification of the service data item then concludes successfully in step 99. The service data item was verifiably present on the date/time of the transaction ID, stored in the SmartStamp. If not, the verification of the service data item has failed in step 98. In both cases, the present verification routine then ends and informs its user of the result.

Figure 10:
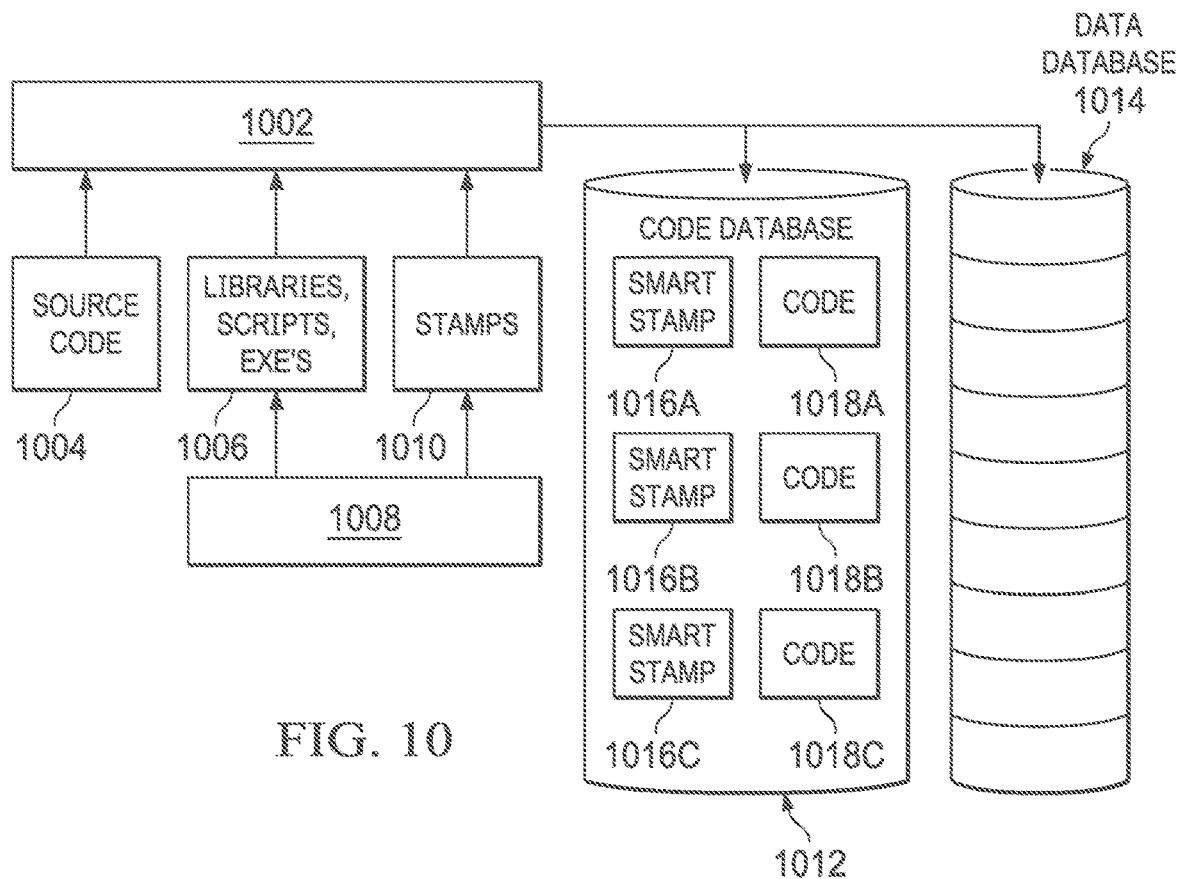
FIG. 10 is an illustration of a system for building components of blockchain-enabled computing, according to embodiments of the present disclosure.

FIG. 10 is an illustration of a system 1000 for building and using components of blockchain-enabled computing, according to embodiments of the present disclosure. For example, a device 1002 may be configured to establish, create, provide, compile, link, or otherwise make available code for other entities to use. Device 1002 may be implemented by one or more electronic devices, servers, computers, systems, subsystems, or any combination thereof. Device 1002 may include one or more processors and memories with instructions for execution by the processor to perform the functionality described herein.

Device 1002 may make code available from any suitable source. For example, device 1002 may have access to locally generated or stored source code 1004, or may receive source code 1006 from other entities, such as system 1008. In one embodiment, device 1002 may compile, link, or otherwise create binary or usable code from source code such as source code 1004 or source code 1006. The binary or usable code may be in any suitable form, such as a linked executable, Docker image, library, application programming interface (API), object code, function, script, or executable. In another embodiment, device 1002 may receive source code 1006 in the form of binary or usable code. In such an embodiment, source code 1006 may be implemented by such binary or usable code. For binaries or usable code that is generated by device 1002 from source code, device 1002 may generate stamps such as SmartStamps discussed above.

As discussed above, in another example, device 1002 may receive binaries, libraries, scripts, executables, or other usable code (in the form of, for example, source code 1006) from another entity, such as system 1008. Device 1002 may propagate the received binaries, libraries, scripts, executables, or other binary or usable code as usable code. Along with such usable code, device 1002 may receive reference identifiers or stamps 1010 for such binary or usable code associated with a blockchain. Stamps 1010 may be implemented by, for example, the SmartStamps discussed above.

The binary or usable code may be stored as code 1018 in a code database 1012. Furthermore, stamps, such as SmartStamps 1016, may also be stored in code database 1012. Code database 1012 may be implemented in any suitable manner, such as a relational database, and may be implemented in any suitable location, such as within device 1002 or communicatively coupled to device 1002 over a network.

In one embodiment, device 1002 may verify or create the authenticity of usable code to be stored as code 1018. For usable code created by device 1002 from source code, the authenticity may be created by creation of a blockchain associated with the usable code created. For usable code originating from already existing usable code 1006 received from other entities, the authenticity may be verified by creation of additional links within an existing blockchain for the usable code. Creation of a blockchain, or of additional links within an existing blockchain, may be accomplished by generation of SmartStamps 1016 or reference identifiers. SmartStamps 1016 may be stored in associated blockchains, or in code database 1012. Code 1018 may be stored according to an index of reference identifiers or SmartStamps 1016. Copies of code 1018 may otherwise be distributed to possible consumers and users of code. For example, copies of code 1018 may be downloaded as part of a web plugin, or scripted code to be executed by any suitable client, such as a mobile device, computer, or other suitable electronic device.

In addition, data to be accessed by, used by, or output from code 1018 may be stored in a data database 1014. Data database 1014 may be implemented in any suitable manner, such as a relational database, and may be implemented in any suitable location, such as within device 1002 or communicatively coupled to device 1002 over a network. In one embodiment, SmartStamps 1016 may include links to corresponding elements in data database 1014. In another embodiment, data database 1014 may include its own instances of SmartStamps 1016 (not shown) that may correspond to SmartStamps 1016 in code database 1012. There may be N instances of SmartStamps 1016 in data database 1014 for each instance of SmartStamps 1016 in code database 1012. Data of data database 1014 to be accessed by or otherwise used by the code may include, for example, parameters, source information, destination information, or any other needed information. Data of data database 1014 may include output produced by the code.

In one embodiment, device 1002 may verify or create the authenticity of usable data to be stored in data database 1014. For usable code created by device 1002 from source code, the authenticity may be further created by creation of a blockchain associated with the inputs and outputs of the usable code created therefrom. The same blockchain as was created for the code itself may be used. For inputs and outputs of usable code originating from already existing usable code 1006 received from other entities, the authenticity may be verified by creation of additional links within an existing blockchain for the inputs and outputs of the usable code. SmartStamps 1016 may be stored in associated blockchains, or in data database 1014. Data elements within data database 1014 may be stored according to an index of reference identifiers or SmartStamps 1016. The data inputs or outputs of code 1018 that are stored in data database 1014 may be, for example, known test data and subsequent outputs to be used to verify operation of code 1018. In some applications, data inputs or outputs of code 1018 as stored in data database 1014 would be a priori known to entities executing code 1018. However, by storing indicia of data inputs or outputs of code 1018 in a blockchain, entities executing code 1018 might not need to know the known data input or output of code 1018. By storing such indicia, rather than data inputs or outputs of code 1018 themselves in the blockchain, the data can be anonymized.

Copies of code 1018 may otherwise be distributed to possible consumers and users of code. For example, copies of code 1018 may be downloaded as part of a web plugin, or scripted code to be executed by any suitable client, such as a mobile device, computer, or other suitable electronic device.

Source code 1004 is an example implementation of a service data item as discussed in FIG. 1, etc. Furthermore, inputs and outputs to source code 1004 or code 1018 may be example implementations of a service data item as discussed in FIG. 1, etc. SmartStamps 1016A-C are example implementations of data item verification fingerprints as discussed in FIG. 1, etc. Thus, any given instance of source code 1004 and associated inputs or outputs as data that might be used in a protected system may have one or more associated SmartStamps 1016. By verifying SmartStamps 1016 with a blockchain, nothing might be executed without verification through the blockchain that code or data is unaltered.

As described above, SmartStamps 1016A-C may be stored in a databases such as code database 1012 or data database 1014, from which systems may verify the authenticity of source code 1004, 1006 to be executed. In another embodiment, a system verifying use of source code 1004, 1006 may include a pre-processing stage such as shown in FIG. 10 wherein stamps 1010 are received or generated, and then optionally stored as SmartStamps 1016A-C. Source code 1004, 1006 and associated data items may be received from trusted sources. SmartStamps 1016A-C may be generated and used subsequently in a blockchain. Storage in database 1012 in such a case may be unnecessary or omitted, or may nonetheless be performed for efficient reuse in the future. SmartStamps 1016A-C may identify the input state, output state, creator, or permissible users of code to be executed. SmartStamps 1016A-C may be created by any suitable electronic device, such as a device shown in FIG. 12 and in device 1002.

Source code 1004, 1006 may be accessed, executed, invoked, or otherwise used in any suitable manner. For example, source code 1004, 1006 may be executed in a remote method call through an API call. The access may be made through device 1002, whether by a process within device 1002 or communicatively coupled to device 1002. Inputs to device 1002 for execution of source code 1004, 1006 may be made through input parameters, registers, files, or any other source. Outputs from device 1002 with results of execution of source code 1004, 1006. In one embodiment, source code 1004, 1006 may be executed and its inputs and outputs recorded, then validated by reference to a blockchain, and the execution allowed or reverted based upon the validation.

An "on-chain" operation or transaction may be an operation that is considered to be valid when a blockchain reflects the transactions on a public ledger. This may include an authentication and a validation of a transaction by a defined number of participants. The details of the transaction. Every step linked to an on-chain transaction may occur on or be reflected in the blockchain, thus the blockchain itself is modified to reflect the transaction.

An "off-chain" operation or transaction may include an operation that operates independently without accessing a block-chain during the operation to validate information used therein for processing. Such an off-chain operation system might perform a check of information at the beginning or at the end of processing some information, such as validating a request or an output from the request, but will not publish results to the publicly available block-chains for validating many steps during the processing of the information.

Whenever source code 1004, 1006 is to be accessed, device 1002 may be configured to determine the input state and the output state of the code, including data passed into the code or from the code. Moreover, device 1002 may be configured to determine an entity that created the code and an entity that is accessing the code. Device 1002 may validate any other aspects of execution. These may be hashed and registered in one or more blockchains. Verification of the input state, output state, creator or user of the code, and of the code itself may be made by evaluating SmartStamps 1016.

In effect, this turns off-chain execution into the equivalent of an on-chain smart contract, but at the usually much higher scalability and performance of an off-chain system, but without the need to migrate such a system "onto" a blockchain. A difference, however, lies in the degree of enforceability and guaranteed execution of the code. While an on-chain smart contract enforces on-chain actions like currency transfers, an off-chain execution engine will provide a similar guarantee for its off-chain execution context but limited to the trustworthiness of the system (such as 1002). Depending upon (a) on the actual application which of the two guarantees is preferred and (b) on the location of inputs and outputs, the use may be considered mostly or all on-chain, which would make an on-chain smart contract preferable, or located in or next to the off-chain system, which would make co-locating storage of the blockchain with the actual execution in device 1002 a preferable solution.

Figure 11:
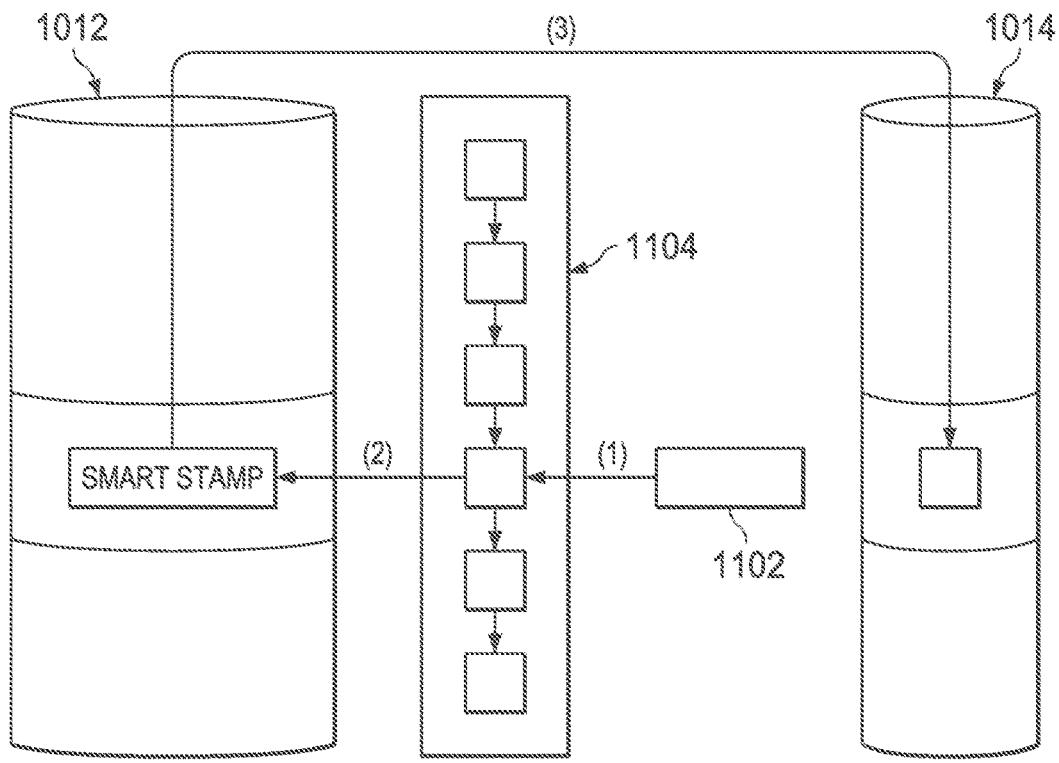
FIG. 11 is an illustration of a system for blockchain-enabled computing, according to embodiments of the present disclosure.

FIG. 11 is an illustration of a system 1100 for blockchain-enabled computing, according to embodiments of the present disclosure. System 1100 may illustrate a more detailed example of system 1000 of FIG. 10.

Figure 12:
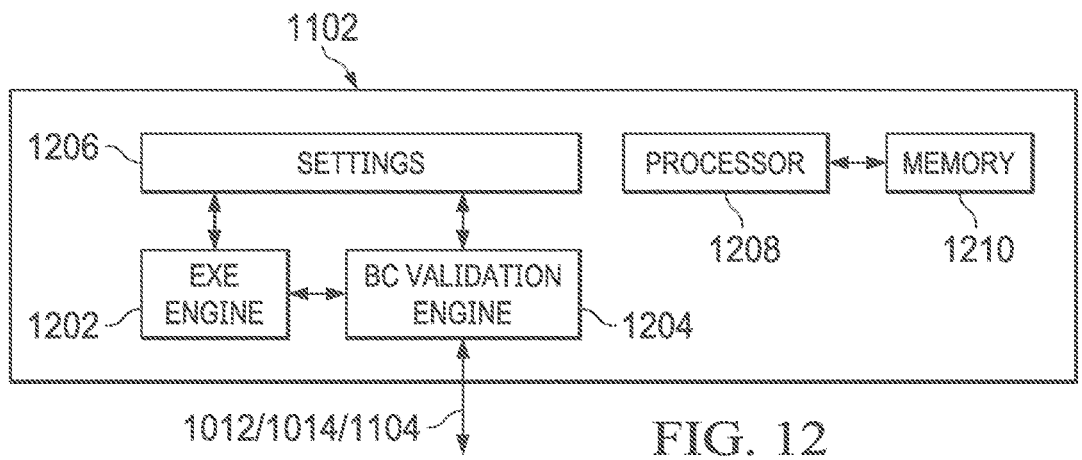
FIG. 12 is an illustration of an example instance of a device, according to embodiments of the present disclosure.

System 1100 may include, for example, a personal computer, server, mobile device, or any other suitable electronic device or subsystem. These may be represented by device 1102. More detailed implementations of device 1102 are illustrated in FIG. 12, below. Device 1102 may attempt to execute code, and thus may include any suitable electronic devices that may attempt to execute code. The code may be general-purpose code. Device 1102 may receive code in any suitable form, such as in source code form or in binary code form. Device 1102 may be a more detailed implementation of device 1002.

The code may be verified via, for example, a blockchain 1104. Blockchain 1104 may record a series of transactions. Blockchain 1104 may be implemented in any suitable manner. Blockchain 1104 may be co-located with device 1102 in a system, or located remotely from device 1102.

Device 1102 may be configured to determine that code is to be executed. Upon attempted execution of code therein, at (1) device 1102 may be configured to look up the code in blockchain 1104. This may be performed by determining a hash of the code. The presence of code in blockchain 1104 may indicate that the code can be executed in a trusted manner utilizing blockchain 1104, as opposed to running in an unsecured manner. Thus, device 1102 may determine whether further use of blockchain 1104 and other verification elements will be made.

Furthermore, device 1102 may hash an input state to the code and look up the hash in blockchain 1104. The presence of the input state in blockchain 1104 may indicate that the code can be executed in a trusted manner utilizing blockchain 1104, as opposed to running in an unsecured manner. Preliminary execution of the code may be performed with or without verification of the code itself and the input state, so as to yield an output state. The output state may also be hashed and looked up in blockchain 1104. The presence of the output state in blockchain 1104 may indicate that the code can be executed in a trusted manner.

In one embodiment, by using blockchain 1104 and other verification elements, device 1102 may perform blockchain-enabled computing. If execution of given code is validated by blockchain 1104 and other verification elements, device 1102 may continue to execute the code, or accept the results of execution of the code. Thus, execution of code may be considered blockchain-enabled.

At (2), an associated element of blockchain 1104 may identify that a smart stamp or identifier exists for the source code to be validated. In one embodiment, based on such a determination of the smart stamp for the source code to be validated, device 1102 may look up the associated smart stamp (such as an instance of SmartStamp 1016) in code database 1012. Code database 1012 may be privately or publicly held. The smart stamp for the code may be amalgamated with other smart stamps for other code. Device 1102 may then validate the code based upon the smart stamp. Blockchain entries may be validated based upon, for example, the virtual machine, processor, internet protocol (IP) address, or other identifier of the system that created the code to be executed.

At (3), an associated element of blockchain 1104 may identify that a smart stamp or identifier exists for the source code to be validated in terms of its input state and its output state. In one embodiment, based on such a determination of the smart stamp for the input or output state to be validated, device 1102 may look up the associated smart stamp (such as an instance of SmartStamp 1016) in data database 1014. Data database 1014 may be privately or publicly held. The smart stamp for the input and output states of the code may be amalgamated with other smart stamps for input and output states of other code. Device 1102 may then validate the code based upon the smart stamp. If needed, preliminary execution of the code may be performed to obtain the output state.

In addition, a hash of the entity that created a blockchain element (such as SmartStamp 1016) such as a stamp for code or its input/output may be identified by SmartStamp 1016. The hash of the entity may be validated as well as a known or trusted identify.

If the code is validated, then device 1102 may execute the code. The execution may be a release of execution results already performed to determine the output state. Furthermore, if validated, corresponding data in data database 1014 may be committed for the execution of the code, or results of execution of the code may be stored in data database 1014.

FIG. 12 is an illustration of an example instance of device 1012, according to embodiments of the present disclosure. Device 1012 may be used to perform the creation of smart stamps from source code or the validation of source code in the above figures.

Device 1012 may include a processor 1208 communicatively coupled to a memory 1210. Memory 1210 may include instructions that, when executed and loaded by processor 1208, may provide functionality for various components of device 1012, such as engines 1202, 1204. Device 1012 may include an execution engine 1202 and a blockchain validation engine 1204. Engines 1202, 1204 may be implemented in any suitable manner, such as by analog circuitry, digital circuitry, instructions for execution by a processor such as processor 1208, or any suitable combination thereof. Part of engines 1202, 1204 may be implemented as part of processor 1208. Executable engine 1202 may be configured to execute code. Blockchain validation engine 1204 may be configured to create or validate information in association with blockchains. For example, blockchain validation engine 1204 may communicate with other elements of FIG. 10 or FIG. 11 for creating or validating smart stamps, accessing code database 1012, data database 1014, blockchain 1104, or other elements for blockchain-related tasks. Blockchain validation engine 1204 may be configured to perform validation operations on behalf of device 1012.

In order to determine whether to perform validation tasks, device 1012 may include or be communicatively coupled to settings 1206. Settings 1206 may be implemented in any suitable manner, such as by a file, register parameter of an API call invoking execution, or any other suitable storage implementation. Settings 1206 may define whether blockchain validation will be performed for a given execution of code. Thus, operation of blockchain validation engine 1204 and blockchain validation operation may be enabled or disabled. Furthermore, settings 1206 may identify a particular instance of a blockchain or smart stamps to be used for validation.

Figure 13:
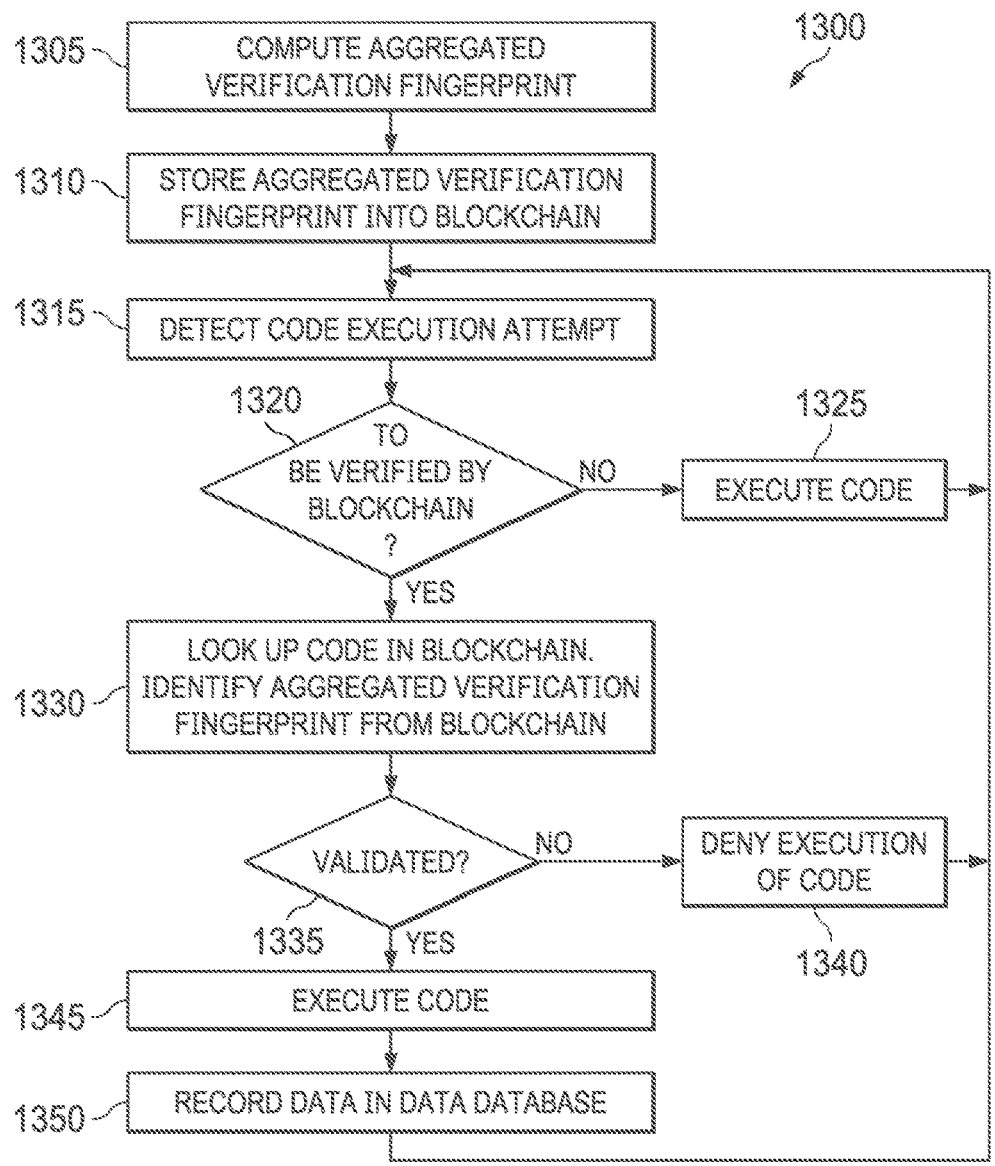
FIG. 13 is an illustration of an example method for blockchain-enabled computing, according to embodiments of the present disclosure.

FIG. 13 is an illustration of a method 1300 for blockchain-enabled execution, according to embodiments of the present disclosure. Method 1300 may be performed by more or fewer steps than illustrated in FIG. 13. Moreover, various steps of method 1300 may be omitted, repeated, performed recursively, performed in parallel, or performed in various order. Method 1300 may optionally repeat. Method 1300 may be performed by instructions stored on a non-transitory memory for execution by a processor, analog circuitry, digital circuitry, or any combination thereof, such as by device 1102 as discussed above. Method 1300 may begin at any suitable step, such as 1305. Method 1300 may be performed for executable items such as source code. Each executable item may be associated with a data item verification fingerprint.

At 1305, an aggregated verification fingerprint may be computed. The fingerprint may be computed from two or more data item verification fingerprints. The aggregated verification fingerprint may be performed using a one-way compression function. The resulting aggregated verification fingerprint may have a bit length. The bit length may be less than a bit length of a concatenation of the underlying data item verification fingerprints.

At 1310, the aggregated verification fingerprint may be stored in at least one blockchain. Thus, the storage of the aggregated verification fingerprint is decoupled from the executable data items.

Steps 1305-1310 may be performed at a different time than the remainder of steps of method 1300.

At 1315, an attempt to execute an element of code may be detected. At 1320, it may be determined from settings whether the code is to be validated using a blockchain. If so, method 1300 may proceed to 1325. Otherwise, method 1300 may proceed to 1330.

At 1325, the code may be executed without blockchain verification. Method 1300 may repeat at 1315.

At 1330, the code may be looked up in a blockchain. From the blockchain, an identifier of the code to be executed may be used to identify a smart stamp in a code database. The smart stamp may be indexed with the code to be executed. The smart stamp may embody the aggregated verification fingerprint.

At 1335, the smart stamp may be used to validate the code to be executed. The smart stamp may be used to identify a source of the code, input states of the code, and output states of the code. If the code is validated, method 1300 may proceed to 1345. Otherwise, method 1300 may proceed to 1340.

At 1340, the code may have been determined to not be validated, and thus the code might not be executed. Method 1300 may repeat at 1315.

At 1345, the code may have been validated. The code may be executed.

At 1350, results from the code may be stored in a data database. Method 1300 may repeat at 1315.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or mutually different embodiments does not indicate that a combination of these measured cannot be used to advantage. In contrast, several combinations of embodiments or further embodiments comprising features of different embodiments are conceivable.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

I claim:

1. A computer-implemented method for tamper-evident recording of a plurality of executable items, each executable item being associated with a data item verification fingerprint, comprising:

computing an aggregated verification fingerprint from at least a plurality of data item verification fingerprints using at least one one-way compression function, so that the aggregated verification fingerprint has a first bit length, which is less than a total bit length of a concatenation of the data item verification fingerprints;

storing the aggregated verification fingerprint in at least one blockchain;

attempting to execute an element of code;

validating the element of code against the aggregated verification fingerprint; and based on the validation, allowing execution or denying execution of the element of code.

2. The method of claim 1, wherein storing the aggregated verification fingerprint in at least one blockchain causes decoupling of the storage of the aggregated verification fingerprint from the executable data items.

3. The method of claim 1, wherein validating the element of code is performed conditionally.

4. The method of claim 1, further comprising storing an input state and an output state of the execution in a data database.

5. The method of claim 1, wherein validating the element of code against the aggregated verification fingerprint includes validating an identity of the element of code against the aggregated verification fingerprint.

6. The method of claim 1, wherein validating the element of code against the aggregated verification fingerprint includes validating an input state of the element of code against the aggregated verification fingerprint.

7. The method of claim 1, wherein validating the element of code against the aggregated verification fingerprint includes validating an output state of the element of code against the aggregated verification fingerprint.

8. An article of manufacture, comprising a non-transitory machine-readable medium, the medium including instructions, the instructions, when loaded and executed by a processor, cause the processor to:
compute an aggregated verification fingerprint from at least a plurality of data item verification fingerprints using at least one one-way compression function, so that the aggregated verification fingerprint has a first bit length, which is less than a total bit length of a concatenation of the data item verification fingerprints;
store the aggregated verification fingerprint in at least one blockchain;
receive an attempt to execute an element of code;
validate the element of code against the aggregated verification fingerprint; and
based on the validation, allow execution or deny execution of the element of code.

9. The article of claim 8, wherein storing the aggregated verification fingerprint in at least one blockchain causes decoupling the storage of the aggregated verification fingerprint from the executable data items.

10. The article of claim 8, wherein validating the element of code is performed conditionally.

11. The article of claim 8, further comprising instructions configured to cause the processor to store an input state and an output state of the execution in a data database.

12. The article of claim 8, wherein validating the element of code against the aggregated verification fingerprint includes validating an identity of the element of code against the aggregated verification fingerprint.

13. The article of claim 8, wherein validating the element of code against the aggregated verification fingerprint includes validating an input state of the element of code against the aggregated verification fingerprint.

14. The article of claim 8, wherein validating the element of code against the aggregated verification fingerprint includes validating an output state of the element of code against the aggregated verification fingerprint.

* * * * *